Figure 1:
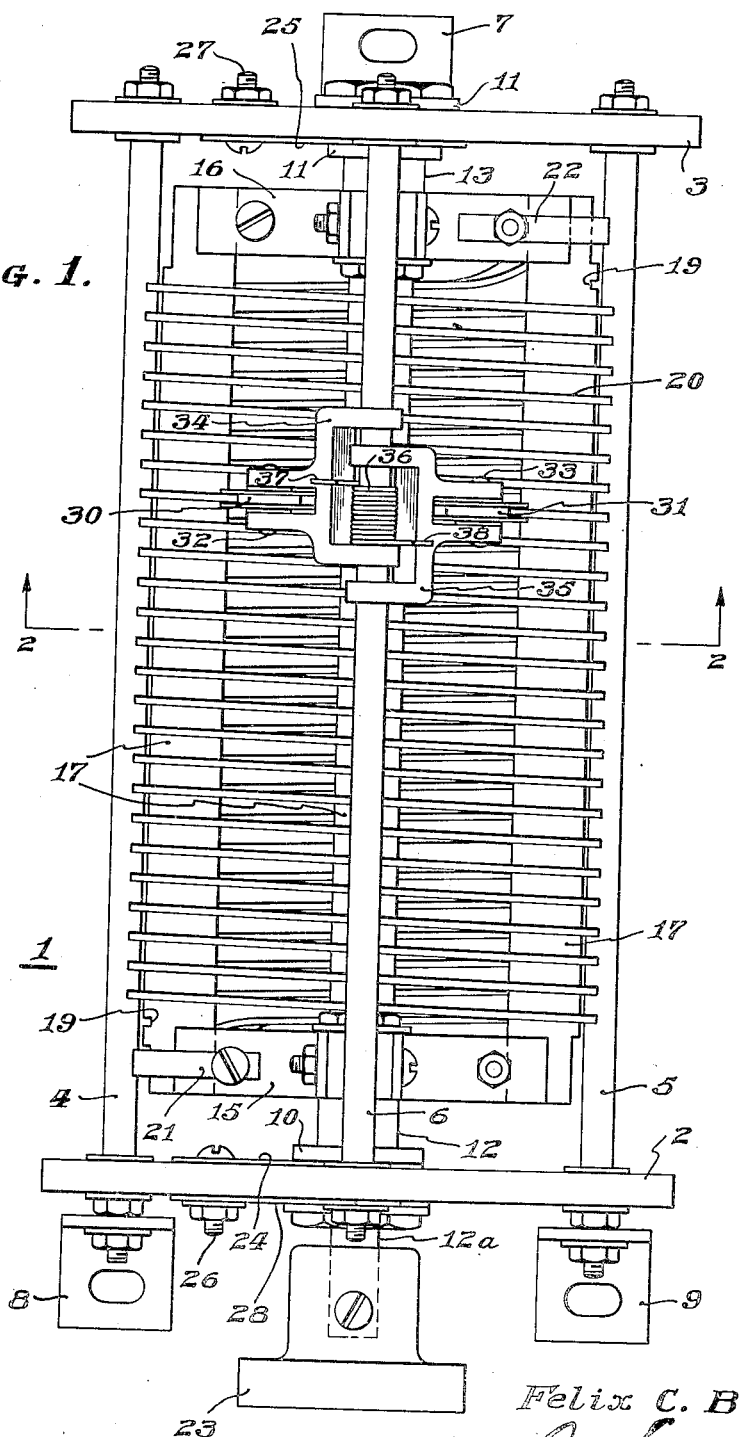

Oct. 31, 1939.  F. C. BLANCHA  2,178,221
CONTINUOUSLY VARIABLE INDUCTANCE DEVICE
Filed Sept. 30, 1937  2 Sheets-Sheet 1

Inventor
Felix C. Blancha
By
Attorney

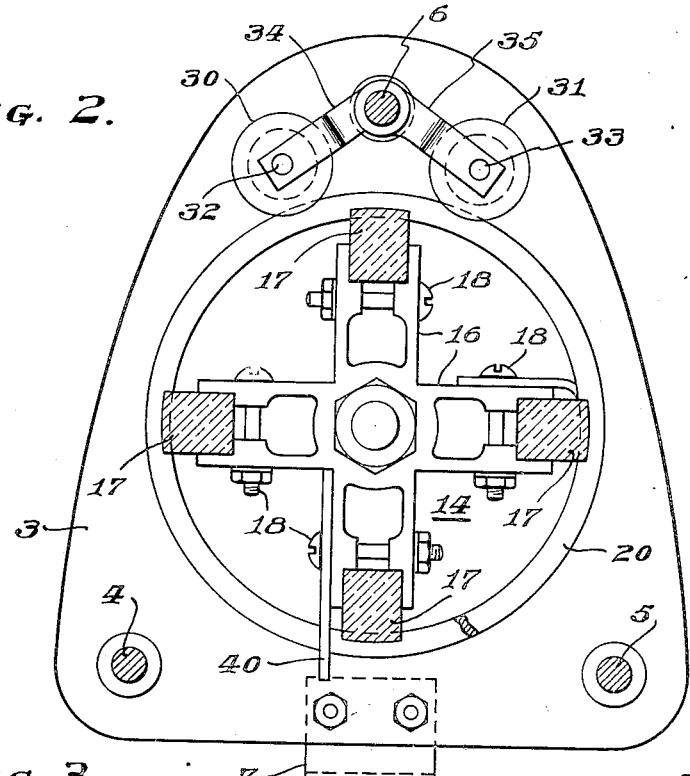

Patented Oct. 31, 1939

2,178,221

UNITED STATES PATENT OFFICE 2,178,221

CONTINUOUSLY VARIABLE INDUCTANCE DEVICE

Felix C. Blancha, Manoa, Pa., assignor to Radio Corporation of America, a corporation of Delaware Application September 30, 1937, Serial No. 166,649

2 Claims. (Cl. 171—242)

This invention relates broadly to inductance devices and particularly to an improved construction of continuously variable inductor suitable for use in the frequency determining or "tank" circuit of a radio transmitter or like signaling apparatus.

The prior art is replete with mechanical systems for variably adjusting the effective number of turns of an inductor. In the usual system, a brush or wiper arm is employed as a variable contact element and the brush or arm is moved along the discrete turns of the coil as by a worm gear or other drive mechanism. The principal objection to such devices resides not alone in the fact that the brushes or wiper arms are subject to excessive friction and wear, but in that the wear is irregular and rapid. This is so because it is practically impossible to so wind and mount the coil that there is no eccentric movement between it and the brush or wiper arm.

Irregular wear affects the electrical continuity of the system in which the inductor is included. Rapid wearing of the variable contact element dictates frequent replacement of parts and this is not always convenient, particularly where, as is usually the case, the brush or arm is relatively inaccessibly disposed in the interior of the coil.

Accordingly, the principal object of the present invention is to provide a continuously variable inductance device employing a movable contact element of novel construction, and one which is subject to minimum wear in spite of eccentricities in the construction and relative movement of the inductor.

Another object of the invention is to provide a simple, inexpensive and trouble-free continuously variable inductor wherein the parts are readily accessible and the operation of which is characterized by a high degree of smoothness, low friction and minimum electrical loss.

Other objects and advantages, together with certain details of construction, will be apparent and the invention itself will be best understood by reference to the following specification and to the accompanying drawings wherein:

Figure 1 is a top plan view of a continuously variable inductor constructed in accordance with the principle of the invention, Figure 2 is a transverse sectional view of the line 2—2 of Fig. 1, Figure 3 is an enlarged fragmentary view partly in elevation and partly in section, showing certain details of construction of the contact elements of Figs. 1 and 2, and Figure 4 is a similar view showing the contact element of the invention adapted for use with a coil formed of round wire.

In the drawings, wherein like reference characters designate the same or corresponding parts in all views, 1 designates generally a chassis or frame having a front and a rear insulating panel 2 and 3, respectively, which are maintained in spaced rigid relationship by a pair of metal rods 4 and 5 which are fixed to the panels adjacent their base and a third metal rod 6 which is centrally disposed between the two panels adjacent the top of the frame. A rear flange 7 fixed to the rear panel 2 and two front flanges 8 and 9 which are secured to the bottom rods 4 and 5 adjacent the front of the frame constitute a supporting pedestal for the device.

Journaled for rotation in bushings 10 and 11 in the panels 2 and 3 are two stub shafts 12 and 13, respectively, which support a coil form indicated generally at 14 (Fig. 2). This coil form may comprise a front and rear group of four bifurcated arms 15, 16, respectively, which extend radially from the stub shafts 12 and 13 upon which they are respectively mounted. The arms 15 and 16 are aligned one with another and each pair of arms supports an insulating spacer bar 17 which is clamped rigidly in the bifurcated ends by the bolts 18. Each spacer arm is provided with lateral grooves 19 (see Fig. 1) on its exposed outer surface in which a ribbon like conductor 20 (Figs. 1, 2 and 3) or wire like conductor 20ᵃ (Fig. 4) is spirally wound. In the event that a ribbon like conductor is employed, it is preferably wound edgewise as shown in Figs. 1, 2 and 3. The opposite ends of this coil are fixed as at 21, 22, respectively, to the oppositely located bifurcated sets of crossed arms 15 and 16. The coil form has an axis of rotation which coincides with the common axis of the stub shafts 12 and 13 and may be rotated thereabout as by means of an insulating control knob 23 which is fixed on an extension 12ᵃ of the stub shaft at the front of the chassis.

Since the crossed arms 15 and 16 are of metal and are supported on the metal stub shafts 12 and 13 which are journaled for rotation in the metal bushings 10 and 11, it is apparent that electrical connections may be made to the exterior of the panels 2, and 3, irrespective of the "setting" or angle of rotation of the coil form. Such electrical connection is conveniently established by means of metal strips 24 and 25 which extend along the opposite faces of the front and rear panels to binding posts 26 and 27, respectively. A third metal strip 28 on the front surface of panel 2 extends from the binding post 26 to the upper central metal rod 6.

For the purpose of variably adjusting the electrically effective number of turns of the coil (that is to say: for altering its effective inductance) the present invention provides one or more grooves trolley wheels 30, 31, Figs. 1, 2 and 3, 30ª, Fig. 4, supported in suitable bearings 32, 33 on oppositely extending U-shape members 34 and 35 which are mounted for slidable movement along the upper conductive rod 6. As shown in the drawings, this rod or guideway extends through the parallel arms of the U-shape members 34, 35 and one arm of each of these members is preferably disposed within the U of the other member. This permits of a limited range of relative movement between these trolley-wheel supports to compensate for any unevenness in the contour of the coil surface and also any eccentricities in rotation of the coil due to inaccuracies in its mounting. A spring 36 which is more or less loosely wrapped about rod 6, to permit it to slide therealong, has its terminals 37 and 38 resting on the oppositely extending arms 34 and 35, respectively, so that a downwardly directed biasing force is applied to the trolley wheels 30 and 31, and maintains them in contact with a common turn of the spirally wound ribbon or wire 20 constituting the inductor. As more clearly shown in Figs. 3 and 4 each trolley wheel is preferably provided with inwardly sloping surfaces which contact the conductor 20 along only its side edges so that there is a minimum of friction, consistent with good contact, when the coil is moved under the wheel.

When the control knob 23 is rotated the coil rotates in contact with the trolley wheels 30, 31 and since the coil is spiral wound these wheels will be moved together with their supports 34, 35 along the rod 6 and in a direction determined by the direction of rotation of the coil. Thus a maximum value of inductance may be achieved when the trolley wheels are moved to the front of the coil and a minimum value of inductance when these wheels are at the opposite end of the coil. In order to halt the movement of the coil and its contact elements when the wheels reach the ends of the coil a stop 40 is provided on each of the sets of crossed arms 15 and 16. As shown more clearly in Fig. 2 (which shows the rear stop 40) each stop may be in the form of a rigid metal strip fixed to the side of one of the arms of the coil support, and which extends radially therebeyond. Thus when the U-shape supports for the trolley wheels reach an end of the rod 6 one or the other of the stops 40 is in the path of these members and halts their movement as well as that of the coil.

The preferred embodiments of the invention herein described are susceptible of various modifications. It is to be understood therefore that the foregoing is to be interpreted as illustrative and not in a limiting sense except as required by the prior art and by the spirit of the appended claims.

What is claimed is:

1. A continuously variable inductance device comprising a space wound coil mounted for rotation, a fixed rod mounted parallel to the axis of rotation of said coil, a pair of U-shape members provided with aligned orifices in their arms and through which said rod extends to permit of slideable movement therealong, said U-shape members extending in opposite directions from said rod, and one arm of each of said members falling within the U of the other member to permit of a limited range of relative movement between said members on said rod, a spring slideable on said rod and positioned between the said arms of the U-shape members, the opposite terminals of said spring resting on said oppositely directed U-shape members whereby they are downwardly biased in the direction of said coil, a trolley wheel subject to said biasing force supported for rotation on each U-shape member in contact with a common turn on said coil, means for rotating said coil to cause said trolley wheels to travel along said turn, means for establishing an electrical connection to said coil through said rod and trolley wheels whereby various values of inductance may be utilized, and means for halting the movement of said trolley wheels when the maximum and the minimum values of inductances of which said coil is capable are achieved.

2. A continuously variable inductance device comprising a space wound coil having an axis of rotation, a fixed rod mounted parallel to said axis, a pair of outwardly extending oppositely located trolley wheels mounted to permit of relative movement on and along said rod, a biased coil spring slideably mounted on said rod and having its ends connected in force transmitting relationship with said trolley wheels whereby the biasing force of said spring is applied to said wheels and maintains them in contact with said coil irrespective of minor eccentricities in the winding thereof, and means for rotating said coil to vary the position of said trolley wheels and coil spring thereon.

FELIX C. BLANCHA.